United States Patent [19]

Lunati

[11] Patent Number: 5,165,510
[45] Date of Patent: Nov. 24, 1992

[54] CENTRIFUGAL FRICTION CLUTCH

[76] Inventor: Joe A. Lunati, 2550 S. Germantown Rd., Germantown, Tenn. 38138

[21] Appl. No.: 793,635

[22] Filed: Nov. 18, 1991

[51] Int. Cl.$^5$ .............................................. F16D 13/18
[52] U.S. Cl. .......................... 192/105 CE; 192/103 B; 192/104 C
[58] Field of Search ........ 192/103 B, 104 C, 105 CE, 192/105 CF

[56] References Cited

U.S. PATENT DOCUMENTS

| | | | |
|---|---|---|---|
| 699,461 | 5/1902 | Dysterud | 192/105 CF |
| 1,203,833 | 11/1916 | Woodward | 192/105 CF |
| 1,256,120 | 2/1918 | Fellows | 192/105 CF |
| 1,724,126 | 8/1929 | Carrey | 192/105 CE |
| 1,726,562 | 9/1929 | Hoerl | 192/105 CE |
| 1,771,525 | 7/1930 | Bryson | 192/105 CF |
| 2,011,427 | 8/1935 | Tranaas | 192/35 |
| 2,789,674 | 4/1957 | Zahradnik et al. | 192/105 CD |
| 2,915,159 | 12/1959 | Gubelmann | 192/105 CE |
| 3,724,622 | 4/1973 | Barbulesco | 192/105 CE |
| 4,111,291 | 9/1978 | Horstman | 192/105 C |
| 4,279,117 | 7/1981 | Lawrence et al. | 192/105 CF X |
| 4,513,848 | 4/1985 | Lo | 192/103 B X |
| 4,593,798 | 6/1986 | Yew | 192/104 C X |
| 4,687,085 | 8/1987 | Shimizu | 192/103 B X |
| 4,856,637 | 8/1989 | Gebhart | 192/105 C |

FOREIGN PATENT DOCUMENTS

| | | | |
|---|---|---|---|
| 185678 | 5/1906 | Fed. Rep. of Germany | 192/105 CF |
| 77166 | 2/1931 | Sweden | 192/105 |

Primary Examiner—Leslie A. Braun
Assistant Examiner—Nicholas Whitelaw
Attorney, Agent, or Firm—Walker, McKenzie & Walker

[57] ABSTRACT

A lightweight centrifugal friction clutch for transmitting torque from an input source to an output shaft, which includes a wheel secured for simultaneous rotation with the output shaft, a clutch band encircling the wheel and secured within a clutch housing rotationally driven by the input source, and a centrifugal mechanism and cam for tightening the clutch band about the wheel for frictional contact and simultaneous rotation therewith. The centrifugal mechanism includes one or more weights positionable on a centrifugal arm, an actuating arm which rotates a cam member, and an adjustment linkage between the two arms. The particular rotational speed at which the clutch engages may be altered by adjusting the tension against a biasing spring that operates against the centrifugal mechanism, by replacing the spring, or by altering the lever action of the centrifugal mechanism by varying the attachment points of the adjustment linkage between the two arms. The clutch housing is sealed by O-rings and filled with oil which dissipates heat to fins on the exterior of the clutch housing. A protective cover encloses the clutch mechanism.

11 Claims, 3 Drawing Sheets

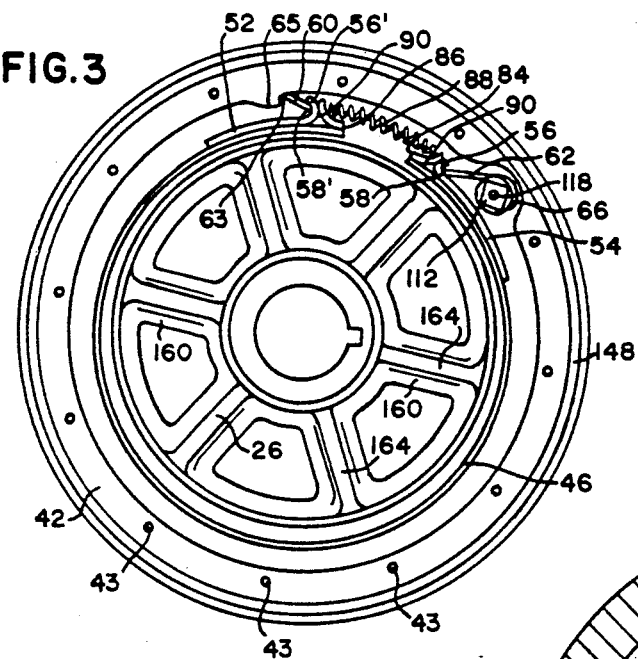
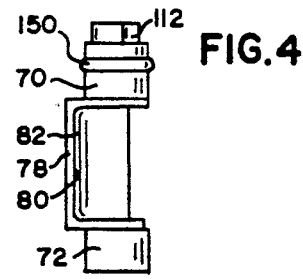
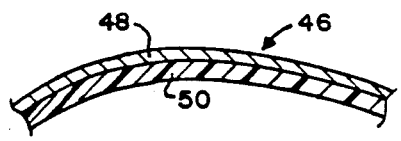
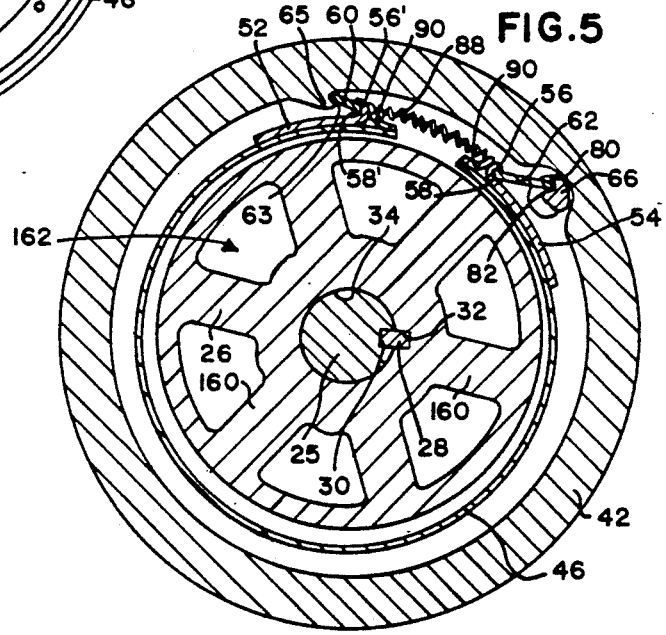
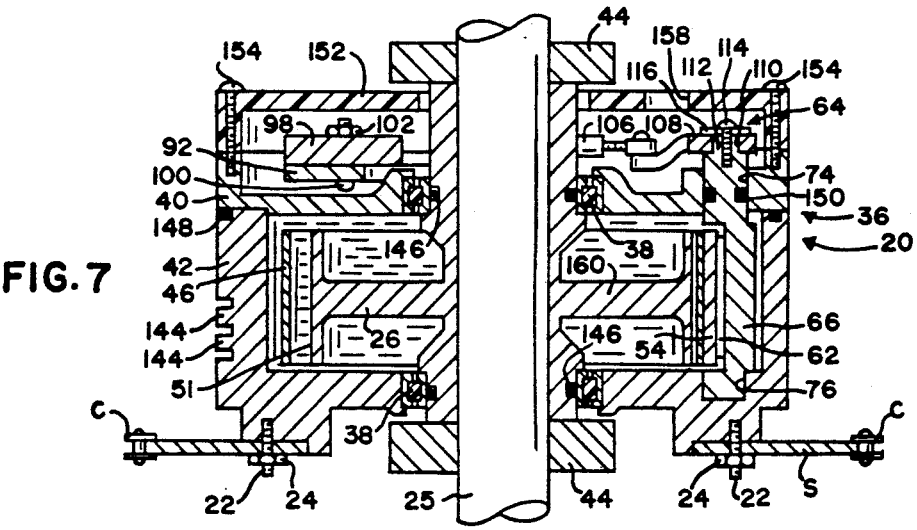

CENTRIFUGAL FRICTION CLUTCH

BACKGROUND OF THE INVENTION

1. Field of the Invention:

The present invention relates, in general, to friction clutches, and in particular, to centrifugal friction clutches in which the frictional elements engage at a predetermined speed of rotation imparted by the input power means.

2. Information Disclosure Statement:

Centrifugal friction clutches which engage at a predetermined rotational speed are useful in combination with motors or engines that have useful torque ranges only at high rotational speeds. Examples of such engines include well-known small displacement gasoline engines used in go-cart racing. One of the problems encountered with such a frictional clutch on such an engine having useful torque only at high RPM is the high relative rotational speed between the input and output of the clutch, necessitating high rates of slippage during the engagement of the clutch. A well-known solution for this problem, particularly when the motor drives an output shaft through a reduction gearing system, is to place the clutch after the reduction gearing system, i.e., directly on the output shaft rather than on the (higher RPM) motor, thereby reducing the slippage that must occur between the input and output portions of the clutch. However, such a solution places a premium on the weight of the clutch because the inertial load presented by the clutch to the motor is thereby increased through the reduction gears between the motor and the clutch.

Additionally, in some applications such as go-cart racing, artificial weight constraints are placed on the total weight of the vehicle in which the clutch is used, and any weight reduction of the clutch may be put to more productive uses elsewhere on the vehicle. Known attempts at creating a centrifugal friction clutch have been complex and heavy, employing a multiplicity of balls or weights to engage the clutch mechanism, and lack ease of adjustability of the rotational speed of engagement of the clutch. Such prior attempts employed transmission disks within the engagement mechanism which are known to warp and produce a very complex clutch mechanism which requires frequent maintenance.

It is therefore desirable to have a lightweight centrifugal friction clutch which can be quickly and readily assembled and disassembled, and which provides for easily adjusting the rotational speed at which the clutch engages.

A preliminary patentability search in Class 192, subclasses 105CE and 105CF produced the following patents, some of which may be relevant to the present invention: Dysterud, U.S. Pat. No. 699,461, issued May 6, 1902; Woodward, U.S. Pat. No. 1,203,833, issued Nov. 7, 1916; Fellows, U.S. Pat. No. 1,256,120, issued Feb. 12, 1918; Bryson, U.S. Pat. No. 1,771,525, issued Jul, 29, 1930; Tranaas, U.S. Pat. No. 2,011,427, issued Aug. 13, 1935; Zahradnik et al., U.S. Pat. No. 2,789,674, issued Apr. 23, 1957; and Gubelmann, U.S. Pat. No. 2,915,159, issued Dec. 1, 1959.

Additionally, Horstman, U.S. Pat. No. 4,111,291, issued Sep. 5, 1978, and Gebhart, U.S. Pat. No. 4,856,637, issued Aug. 15, 1989, describe centrifugal clutches as might be used with go-carts.

While each of the above patents disclose centrifugal clutches, none disclose or suggest the present invention. More specifically, none of the above patents disclose or suggest a centrifugal friction clutch for transmission of torque from a source means for supplying rotational power to an output means for receiving said rotational power, said clutch comprising: a clutch housing rotationally driven by said source means; a wheel mounted for rotation within said clutch housing and secured for simultaneous rotation with said output means; a clutch band encircling said wheel and secured from rotation relative to said clutch housing; and, centrifugal means for tightening said clutch band about said wheel for frictional contact therewith, thereby causing said wheel to rotate with said clutch housing.

Dysterud, U.S. Pat. No. 699,461, describes a centrifugal clutch in which a pair of weighted arms force a pair of clutch shoes into an outer V-shaped groove on a clutch wheel. Similarly, Gubelmann, U.S. Pat. No. 2,915,159, describes a centrifugal clutch in which a multiplicity of weighted arms force a multiplicity of clutch shoes outward into an inner V-shaped groove on a clutch member. Neither Dysterud nor Gubelmann has a clutch band like the present invention.

Woodward, U.S. Pat. No. 1,203,833, describes a centrifugal clutch in which a pair of adjustably weighted arms each tighten one of a corresponding pair of semicircular clutch bands about a clutch drum. Fellows, U.S. Pat. No. 1,256,120, describes a similar pair of weighted arms operating a pair of semicircular clutch bands. The present invention uses no such partially circular clutch bands, but instead employs a clutch band that encircles the clutch wheel.

Tranaas, U.S. Pat. No. 2,011,427, merely describes a non-centrifugal band clutch in which a primary clutch band causes engagement of a main clutch band.

Zahradnik et al., U.S. Pat. No. 2,789,674, describes an inertial-centrifugal clutch in which counterbalanced weights on either end of an arm cause a multi-turn helical wire to constrict about a clutch drum. The present invention has no such multi-turn helical wire about a clutch drum.

Bryson, U.S. Pat. No. 1,771,525, describes a plurality of centrifugal weights that gearably and rotatably engage a band clutch about a clutch wheel, adjustably biased by a spring.

Horstman, U.S. Pat. No. 4,111,291, describes a centrifugal clutch which uses pivoting weights to frictionally engage a set of concentric clutch plates and disks. The present invention has no such concentric clutch plates or disks.

Gebhart, U.S. Pat. No. 4,856,637, describes a centrifugal clutch which uses pivoting weights to bias a conical pressure plate against the face of a conical clutch drum. Unlike the present invention, the Gebhart patent has no clutch band.

SUMMARY OF THE INVENTION

The present invention is a centrifugal friction clutch for transmission of torque from a source of rotational power to an output means for receiving said rotational power, and comprises: a clutch housing rotationally driven by the source, a wheel mounted for rotation within the clutch housing and secured for simultaneous rotation with the output means, a clutch band encircling the wheel and secured from rotation relative to the clutch housing, and centrifugal means for tightening the clutch band about the wheel for frictional contact therewith, thereby causing the wheel to rotate with the clutch housing. One possible application of the clutch is as an axially mounted go-cart clutch, in which the light weight of such a clutch is highly desirable both for inertial reasons and because of constraints on the total cart weight.

It is an object of the present invention to provide a centrifugal friction clutch which is simple and lightweight, and which can be quickly and readily assembled and disassembled. It is a further object that such a clutch should provide simple means for easily adjusting the rotational speed at which the clutch engages.

BRIEF DESCRIPTION OF THE DRAWINGS

FIG. 3 a view similar to that in FIG. 1, but with the housing cover removed to show the interior of the clutch housing and with the chain sprocket removed.

FIG. 4 is a side view of the cam member which tightens the band about the wheel.

FIG. 5 is a sectional view similar to FIG. 3 taken midway through the wheel in the plane of rotation, and also taken with an axle and key inserted through the wheel.

FIG. 6 is a sectional view of a portion of the clutch band showing the fiber lining on the inner surface thereof.

FIG. 7 is a sectional view of the present invention mounted on an axle with the protective cover installed, taken substantially along the diameter line 7—7 shown in FIG. 1, with a section through the weight on the centrifugal arm included for illustration.

DESCRIPTION OF THE PREFERRED EMBODIMENT

Figure 1:
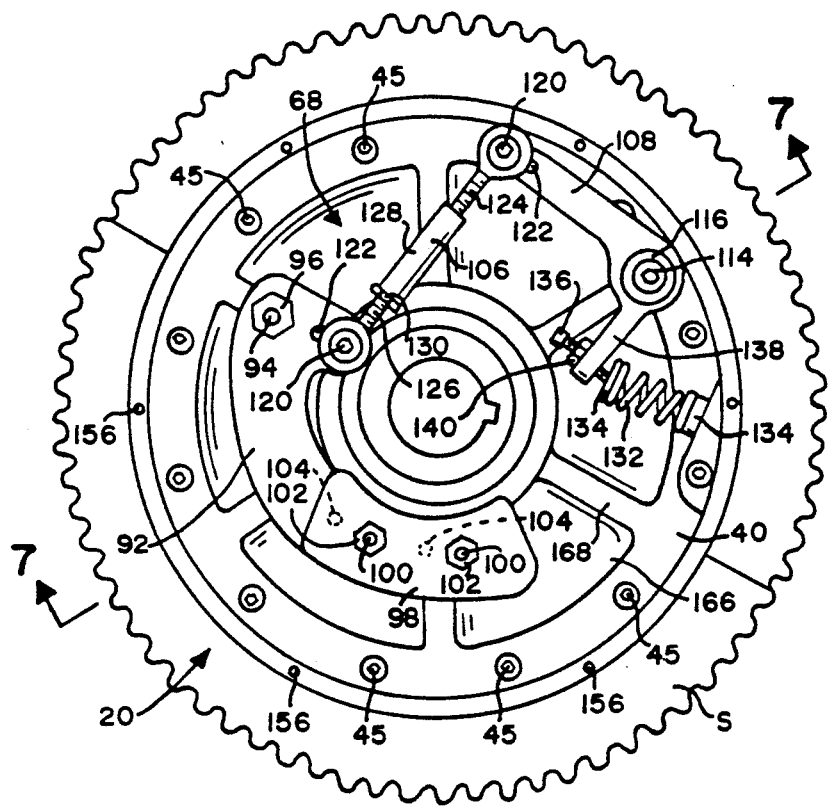
FIG. 1 is a view of the present invention with the protective cover removed to show the centrifugal mechanism in the disengaged clutch position.

Referring to FIGS. 1-8, the centrifugal friction clutch 20 transmits torque from a source means M for supplying rotational power, such as a well-known motor, powering chain C driving sprocket S attached to clutch 20 at studs 22 with nuts 24, to an output means for receiving said rotational power such as axle 25. It is well-known that sprocket S typically may be composed of separate semicircular halves which may be easily removed from axle 25, and typically the tooth ratio between a driving gear on the motor and sprocket S will be such that a reduction in rotational speed, such as an 8 to 1 reduction in speed, is performed between the motor and sprocket S. Clutch 20 includes a wheel 26 secured for simultaneous rotation with output means or axle 25 using well-known securing means such as key 28 in slots 30 and 32 in axle 25 and coaxial bore 34 through wheel 26, respectively. It shall be understood that many equivalent means, such as bolts or the like, for securing wheel 26 to an output means for receiving rotational power, are well-known.

Wheel 26 is preferably mounted for rotation within a clutch housing 36 using bearings 38 which fit in clutch housing cover 40 and housing body 42, and may be anchored from longitudinal movement on axle 25 using collars 44, secured to axle 25 using any well-known means such as screws or the like. Housing cover 40 may be secured to housing body 42 by well-known hex socket screws 45 extending into tapped holes 43 in housing body 42.

Referring to FIGS. 3-7, clutch 20 is seen to also comprise a clutch band 46 encircling wheel 26. Clutch band 46 preferably comprises a metal band portion 48 and preferably has a fiber lining 50 bonded to the surface thereof, by well-known rivets or adhesives, for frictional contact with surface 51 of wheel 26. Clutch 20 includes means for securing clutch band 46 from rotation relative to housing 36 such as a pair of securing brackets 52, 54, one at either end of clutch band 46, attached as by rivets thereto, thereby causing rotational power imparted by the source means to sprocket S to be transferred to clutch band 46 and rotationally driving same, in a manner hereinafter described. Each securing bracket 52, 54 respectively has a lip 56', 56 forming a recess 58', 58 opening away from each respective end of band 46 into which keeper struts 60, 62 are inserted. Strut 60 spans the distance between recess 58' in bracket 52 and a corresponding recess 63 formed by lip 65 on the inner surface of housing body 42, and will be understood to prevent the counterclockwise rotation of clutch band 46 relative to housing body 42 and therefore, housing 36.

Clutch 20 also includes centrifugal means 64 for tightening clutch band 46 about wheel 26 for frictional contact therewith. In the preferred embodiment, centrifugal means 64 includes camming means such as cam member 66 for tightening band 46 about wheel 26 and centrifugal mechanism 68 shown in FIGS. 1-2 for centrifugally actuating cam member 66.

Cam member 66 preferably includes an upper cylindrical portion 70 and a lower cylindrical portion 72 about which cam member 66 is rotated, each disposed in cylindrical bores 74, 76 in housing cover 40 and body 42, respectively. An offset camming portion 78 is formed in cam member 66, preferably having a lip 80 defining a recess 82 for receipt of strut 62. It will be understood, by examination of FIGS. 3-5, that as cam member 66 is rotated counterclockwise, camming action of offset camming portion 78 acting against strut 62 will cause free end 84 of clutch band 46 to move toward anchored end 86 of clutch band 46, thereby tightening clutch band 46 about wheel 26. It will also be understood that, because strut 62, acting against recesses 58 and 82, prevents clockwise rotation of clutch band 46 relative to housing 36, and further that strut 60, as previously described, prevents counterclockwise rotation of clutch band 46 relative to housing 36, that wheel 26 will be caused to simultaneously rotate with housing 36, driven by sprocket S, when clutch band 46 is tightened about wheel 26.

Clutch band 46 also preferably has one or more compression or restoring springs 88, acting in opposition to brackets 90 attached or riveted to either ends of clutch band 46, for restoring clutch band 46 to the untightened condition about wheel 26 when released by cam member 66.

Figure 2:
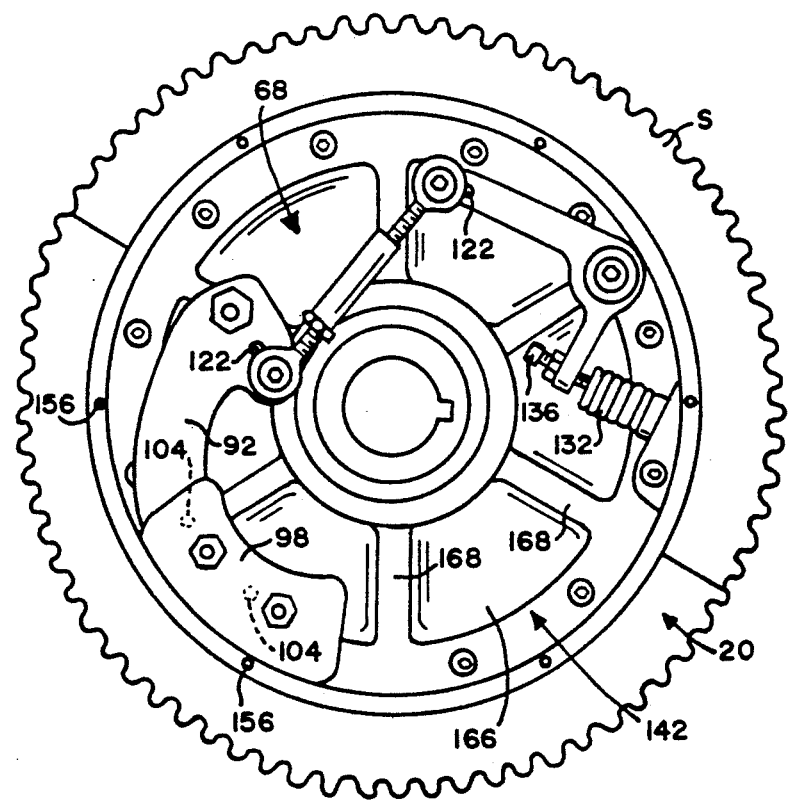
FIG. 2 is the same view as in FIG. 1, but with the centrifugal mechanism shown in the engaged clutch position.
Figure 8:
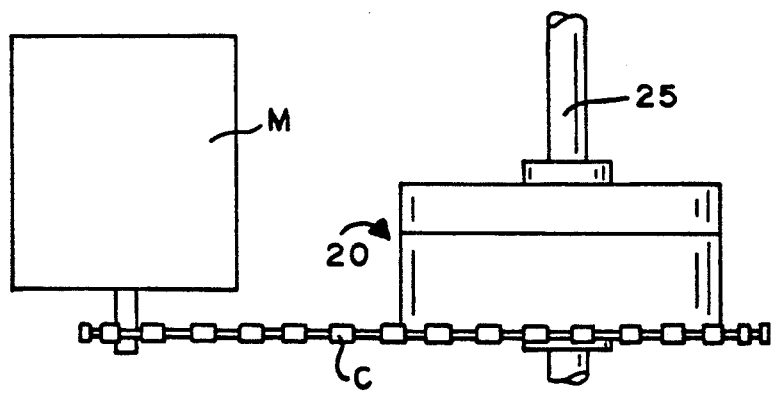
FIG. 8 is a top view of the present invention being driven by a source means of rotational power such as a motor.

Turning to FIGS. 1 and 2, centrifugal mechanism 68 is seen to include a centrifugal arm 92 mounted for pivotal rotation about post 94 and secured thereto by nut 96. Post 94, threadedly secured into housing cover 40, defines a point of rotation for arm 92 about which arm 92 may move in response to centrifugal forces in a manner hereinafter described. Centrifugal arm 92 may include a weight 98 disposed a distance from the point of rotation, thereby determining a well-known inertial moment therewith. Preferably, the moment of weight 98 about the point of rotation may be varied, as by attaching weight 98 to arm 92 by screws 100 and nuts 102, as shown, or by using alternate attachment holes 104 spaced a different distance from the point of rotation. It will be understood that the centrifugal forces caused by the rotation, typically counterclockwise, of clutch housing 36 act upon weight 98, forcing weight 98 to be driven outwardly and causing arm 92 to rotate clockwise about post 94 in response thereto. Increasing the moment of weight 98 by increasing the distance of weight 98 from post 94 necessarily increases the actuating force that arm 92 applies to cam member 66, in a manner hereinafter described.

Centrifugal arm 92 is operably interconnected to cam member 66 preferably through adjustable linkage 106 and actuating arm 108. Actuating arm 108 is fixedly secured for simultaneous rotation with cam member 66, as by square hole 110 in arm 108 mating with square post 112 extending from upper cylindrical portion 70, and by screw 114 extending through washer 116 and into threaded hole 118 in cam member 66. Linkage 106 is attached to arms 92, 108 using hex screws 120, and may be moved to various linkage points on arms 92, 108 by placing screws 120 through alternate holes 122 in arms 92, 108, thereby causing greater or lesser leverage effect of centrifugal arm 92 toward turning of cam member 66, in a manner that will now be understood by those skilled in the art, due to the varied distance of holes 122 from the points of rotation of arms 92, 108, namely, post 94 and screw 114, respectively. Linkage 106 has opposingly threaded portions 124, 126, allowing the turning of barrel 128, having well known mating interior threaded bores, not shown, to shorten or lengthen linkage 106 in a manner that will now be apparent. Barrel 128 may be secured from rotation by nut 130 once a particular length of linkage 106 has been chosen.

Centrifugal means 64 also preferably includes a compression spring 132 urging actuating arm 108, and thereby, centrifugal arm 92, to a position where clutch band 46 is not tightened about wheel 26. Spring 132 operates against spring retainers 134 at either end thereof, and screw 136 which may increase or decrease the restorative urging force exerted by spring 132 against arm portion 138 of arm 108 by compressing spring 132. It will be understood that screw 136 may extend as preferably shown from arm portion 138 to spring 132, or may equivalently extend from housing body 42 to spring 132. Nut 140 is used to lock screw 136 once adjustment of the screw has been completed in a manner hereinafter described.

The present invention may be now seen to comprise adjustment means 142 for establishing the rotational speed of clutch housing 36 at which tightening of clutch band 46 about wheel 26 occurs, in a manner now described. The actuation of cam member 66 by centrifugal mechanism 68 must be of sufficient force to overcome the restorative force of springs 88 and to frictionally tighten band 46 about wheel 26 to cause clutch engagement, as shown in FIG. 2. Several forces interact to cause this actuation. First, the force exerted by spring 132 urging centrifugal mechanism 68 to the disengaged position may be varied by turning screw 136. A typical variation caused by screw 136 might be a variation of 400 RPM in the engagement speed for each full adjustment turn of screw 136. The nominal force exerted by spring 132 can be altered by replacing spring 132 with another spring having a greater or lesser spring constant. The lever action of centrifugal mechanism 68 can be altered by the placement of linkage 106 into alternate holes 122 in arms 92, 108, as previously described. The centrifugal force exerted on arm 92 may be varied by adding heavier or more weights 98, or by altering the moment of weight 98 about post 94 by using alternate attachment holes 104. Any, and preferably all, of these methods of adjustment may be present in the present invention, and the adjustment means 142 for establishing the rotational speed of clutch housing 36 at which clutch engagement occurs may include one or more of these methods.

In operation, adjustable linkage 106 will be adjusted so that when the clutch mechanism is in the position shown in FIG. 1, clutch band 46 will not be tightened about wheel 26, and, when arm 92 is urged toward the position shown in FIG. 2, band 46 becomes securely tightened about wheel 26. It shall be understood that the position shown in FIG. 2 is a somewhat exaggerated and extreme position, with weight 98 shown resting against housing body 42. In practice it will be understood that the engaged condition of the clutch will be reached before weight 98 fully reaches the position shown in FIG. 2, allowing for some stretching of clutch band 46 and wear of lining 50.

Operation of the friction clutch will typically generate heat at the points of contact between band 46 and wheel 26. Therefore, housing 36 is preferably filled with oil to dissipate the heat from band 46 to housing 36. Housing 36 may have one or more fins 144 formed in the exterior thereof for dissipating heat from housing 36, and preferably has recessed O-rings to contain the oil within housing 36. Such O-rings include upper and lower O-rings 146 on wheel 26 sealably contacting bearings 38, O-ring 148 between housing cover 40 and body 42, and O-ring 150 on upper portion 70 of cam member 66.

For safety and also to conceal clutch mechanism 68 from view, a protective cover 152 may be installed using screws 154 into tapped holes 156, see FIGS. 1, 2, and 7. An access and view hole 158 may be provided in cover 152 adjacent screw 136 for allowing an allen wrench to be inserted therethrough for adjustment of screw 136 and for allowing nut 140 to be tightened.

To reduce both the static and inertial weight of clutch 20, wheel 26 is preferably constructed with a multitude of spokes 160 having openings 162 therebetween; for strength, each spoke 160 may have a radial rib 164. Similarly, housing cover 40 may have one or more depressions 166 and radial ribs 168.

Although the present invention has been described and illustrated with respect to a preferred embodiment and a preferred use therefor, it is not to be so limited since modifications and changes can be made therein which are within the full intended scope of the invention.

I claim:

1. A centrifugal friction clutch for transmission of torque from a source means for supplying rotational power to an output means for receiving said rotational power, said clutch comprising:
   (a) a clutch rotationally driven by said source means;
   (b) a wheel mounted for rotation within said clutch housing and secured for simultaneous rotation with and axially connected to said output means;

(c) a clutch band encircling said wheel and secured from rotation relative to said clutch housing; and, (d) centrifugal means for tightening said clutch band about said wheel for frictional contact therewith, thereby causing said wheel to rotate with said clutch housing.

2. The centrifugal friction clutch as recited in claim 1 in which said centrifugal means includes camming means for tightening said clutch band about said wheel.

3. The centrifugal friction clutch as recited in claim 2 in which said centrifugal means additionally includes an arm mounted for pivotal rotation about a point in response to centrifugal forces created by the rotation of said clutch housing, said arm being operably interconnected with said camming means for actuation thereof in response to said pivotal rotation of said arm.

4. The centrifugal friction clutch as recited in claim 3 in which said arm includes a weight disposed a distance from said point of pivotal rotation.

5. The centrifugal friction clutch as recited in claim 4 in which said centrifugal means includes adjustment means for establishing a rotational speed of said clutch housing at which said tightening of said clutch band occurs.

6. The centrifugal friction clutch as recited in claim 5 in which said adjustment means includes a spring urging said arm to a position in which said clutch band is not tightened about said wheel, and in which said adjustment means further includes a screw mounted in opposition to said spring for increasing and decreasing the urging by said spring of said arm.

7. A centrifugal friction clutch for transmission of torque from a source means for supplying rotational power to an output means for receiving said rotational power, said clutch comprising:

(a) a clutch housing rotationally driven by said source means;

(b) a wheel mounted for rotation within said clutch housing and secured for simultaneous rotation with said output means;

(c) a clutch band encircling said wheel and secured from rotation relative to said clutch housing; and (d) centrifugal means for tightening said clutch band about said wheel for frictional contact therewith, thereby causing said wheel to rotate with said clutch housing, said centrifugal means including:

i. camming means for tightening said clutch band about said wheel;

ii. an arm mounted for pivotal rotation about a point in response to centrifugal forces created by the rotation of said clutch housing, said arm including a weight disposed a distance from said point of pivotal rotation and also being operably interconnected with said camming means for actuation thereof in response to said pivotal rotation of said arm; and iii. adjustment means for establishing a rotational speed of said clutch housing at which said tightening of said clutch band occurs, said adjustment means including:

A. a spring urging said arm to a position in which said clutch band is not tightened about said wheel; and B. a screw mounted in opposition to said spring for increasing and decreasing the urging by said spring of said arm, said clutch housing being enclosed and filled with oil such that heat may be dissipated from said clutch band to said clutch housing.

8. The centrifugal friction clutch as recited in claim 6 in which said clutch band includes a fiber lining for frictional contact with said wheel.

9. A centrifugal friction clutch for transmission of torque from a source means for supplying rotational power to an output means for receiving said rotational power, said clutch comprising:

(a) a clutch housing rotationally driven by said source means;

(b) a wheel mounted for rotation within said clutch housing and secured for simultaneous rotation with said output means;

(c) a clutch band encircling said wheel and secured from rotation relative to said clutch housing; and, (d) centrifugal means for tightening said clutch band about said wheel for frictional contact therewith, thereby causing said wheel to rotate with said clutch housing, said centrifugal means comprising:

i. camming means for tightening said clutch band about said wheel;

ii. a centrifugal arm mounted for pivotal rotation about a first point in response to centrifugal forces created by the rotation of said clutch housing;

iii. an actuating arm mounted for pivotal rotation about a second point and fixedly secured to said camming means for actuation thereof in response to said pivotal rotation of said actuating arm; and iv. a linkage connecting said centrifugal arm to said actuating arm.

10. The centrifugal friction clutch as recited in claim 9 in which said centrifugal arm includes a weight disposed a distance from said first point of pivotal rotation of said centrifugal arm.

11. The centrifugal friction clutch as recited in claim 10 in which said linkage is adjustable.

* * * * *